(12) United States Patent
Higgins et al.

(10) Patent No.: US 11,016,936 B1
(45) Date of Patent: May 25, 2021

(54) VALIDATING DATA FOR INTEGRATION

(71) Applicant: Palantir Technologies Inc., Palo Alto, CA (US)

(72) Inventors: Andrew Higgins, Washington, DC (US); Anshuman Prasad, New York, NY (US); Harsh Pandey, Palo Alto, CA (US); Luis Ruigomez, Rye, NY (US); Nabeel Qureshi, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 454 days.

(21) Appl. No.: 15/695,337

(22) Filed: Sep. 5, 2017

(51) Int. Cl.
*G06F 16/16* (2019.01)
*G06F 16/23* (2019.01)
*G06F 40/226* (2020.01)
*G06F 16/25* (2019.01)

(52) U.S. Cl.
CPC ........ *G06F 16/168* (2019.01); *G06F 16/2365* (2019.01); *G06F 16/254* (2019.01); *G06F 40/226* (2020.01)

(58) Field of Classification Search
CPC .... G06F 16/168; G06F 16/254; G06F 40/226; G06F 16/2365; G06F 16/215
See application file for complete search history.

(56) References Cited

U.S. PATENT DOCUMENTS

| | | |
|---|---|---|
| 5,418,950 A | 5/1995 | Li et al. |
| 5,428,737 A | 6/1995 | Li et al. |
| 5,428,776 A | 6/1995 | Rothfield |
| 5,542,089 A | 7/1996 | Lindsay et al. |
| 5,608,899 A | 3/1997 | Li et al. |
| 5,613,105 A | 3/1997 | Xbikowski et al. |
| 5,701,456 A | 12/1997 | Jacopi et al. |
| 5,724,575 A | 3/1998 | Hoover et al. |
| 5,794,228 A | 8/1998 | French et al. |
| 5,794,229 A | 8/1998 | French et al. |
| 5,857,329 A | 1/1999 | Bingham |
| 5,911,138 A | 6/1999 | Li et al. |

(Continued)

FOREIGN PATENT DOCUMENTS

| | | |
|---|---|---|
| DE | 102014103482 | 9/2014 |
| EP | 1647908 | 4/2006 |

(Continued)

OTHER PUBLICATIONS

"A Quick Guide to UniProtKB Swiss-Prot & TrEMBL," Sep. 2011, pp. 2.

(Continued)

*Primary Examiner* — David T. Brooks
(74) *Attorney, Agent, or Firm* — Sheppard Mullin Richter & Hampton LLP

(57) ABSTRACT

Systems, methods, and non-transitory computer readable media are provided for validating data for integration. A file to be integrated into a dataset may be determined. The file may be characterized by a file name and metadata. Whether the dataset can be identified based on the file name and the metadata may be determined. Based on the dataset not being identifiable, information needed to identify the dataset may be requested. Based on the dataset being identifiable, the file may be routed for integration into the dataset.

20 Claims, 5 Drawing Sheets

(56) References Cited

U.S. PATENT DOCUMENTS

| | | | |
|---|---|---|---|
| 5,918,225 A | 6/1999 | White et al. | |
| 6,208,985 B1 | 3/2001 | Krehel | |
| 6,236,994 B1 | 5/2001 | Swartz et al. | |
| 6,289,334 B1 | 9/2001 | Reiner et al. | |
| 6,311,181 B1 | 10/2001 | Lee et al. | |
| 6,321,274 B1 | 11/2001 | Shakib et al. | |
| 6,643,613 B2 | 11/2003 | McGee et al. | |
| 6,745,382 B1 | 6/2004 | Zothner | |
| 6,851,108 B1 | 2/2005 | Syme et al. | |
| 6,857,120 B1 | 2/2005 | Arnold et al. | |
| 6,877,137 B1 | 4/2005 | Rivette et al. | |
| 6,976,024 B1 | 12/2005 | Chavez et al. | |
| 7,028,223 B1 | 4/2006 | Kolawa et al. | |
| 7,085,890 B2 | 8/2006 | Kashyap | |
| 7,155,728 B1 | 12/2006 | Prabhu et al. | |
| 7,216,133 B2 | 5/2007 | Wu et al. | |
| 7,406,592 B1 | 7/2008 | Polyudov | |
| 7,519,589 B2 | 4/2009 | Charnock et al. | |
| 7,546,353 B2 | 6/2009 | Hesselink et al. | |
| 7,610,290 B2 | 10/2009 | Kruy et al. | |
| 7,627,489 B2 | 12/2009 | Schaeffer et al. | |
| 7,783,679 B2 | 8/2010 | Bley | |
| 7,853,573 B2 | 12/2010 | Warner et al. | |
| 7,877,421 B2 | 1/2011 | Berger et al. | |
| 7,908,521 B2 | 3/2011 | Sridharan et al. | |
| 7,979,424 B2 | 7/2011 | Dettinger et al. | |
| 8,073,857 B2 | 12/2011 | Sreekanth | |
| 8,103,962 B2 | 1/2012 | Embley et al. | |
| 8,417,715 B1 | 4/2013 | Bruckhaus et al. | |
| 8,429,194 B2 | 4/2013 | Aymeloglu et al. | |
| 8,433,702 B1 | 4/2013 | Carrino et al. | |
| 8,499,287 B2 | 7/2013 | Shafi et al. | |
| 8,560,494 B1 | 10/2013 | Downing | |
| 8,639,552 B1 | 1/2014 | Chen et al. | |
| 8,799,867 B1 | 8/2014 | Peri-Glass et al. | |
| 8,909,597 B2 | 12/2014 | Aymeloglu et al. | |
| 8,924,429 B1 | 12/2014 | Fisher et al. | |
| 8,935,201 B1 | 1/2015 | Fisher et al. | |
| 9,031,981 B1 | 5/2015 | Potter et al. | |
| 9,105,000 B1 | 8/2015 | White et al. | |
| 9,183,507 B1 * | 11/2015 | Lin | G06N 5/04 |
| 9,292,388 B2 | 3/2016 | Fisher et al. | |
| 9,330,120 B2 | 5/2016 | Colgrove et al. | |
| 9,348,677 B2 | 5/2016 | Marinelli, III et al. | |
| 9,378,526 B2 | 6/2016 | Sampson | |
| 10,311,076 B1 * | 6/2019 | Bruhn | G06F 16/148 |
| 2002/0184111 A1 | 12/2002 | Swanson | |
| 2003/0004770 A1 | 1/2003 | Miller et al. | |
| 2003/0023620 A1 | 1/2003 | Trotta | |
| 2003/0105833 A1 | 6/2003 | Daniels | |
| 2003/0212670 A1 | 11/2003 | Yalamanchi et al. | |
| 2004/0088177 A1 | 5/2004 | Travis et al. | |
| 2004/0098731 A1 | 5/2004 | Demsey et al. | |
| 2004/0103088 A1 | 5/2004 | Cragun et al. | |
| 2004/0126840 A1 | 7/2004 | Cheng et al. | |
| 2004/0139212 A1 | 7/2004 | Mukherjee et al. | |
| 2004/0153837 A1 | 8/2004 | Preston et al. | |
| 2004/0193608 A1 | 9/2004 | Gollapudi et al. | |
| 2004/0254658 A1 | 12/2004 | Sherriff et al. | |
| 2004/0260702 A1 | 12/2004 | Cragun et al. | |
| 2005/0004911 A1 | 1/2005 | Goldberg et al. | |
| 2005/0021397 A1 | 1/2005 | Cui et al. | |
| 2005/0120080 A1 | 6/2005 | Weinreb et al. | |
| 2005/0183005 A1 | 8/2005 | Denoue et al. | |
| 2005/0226473 A1 | 10/2005 | Ramesh | |
| 2005/0278286 A1 | 12/2005 | Djugash et al. | |
| 2006/0004740 A1 | 1/2006 | Dettinger et al. | |
| 2006/0070046 A1 | 3/2006 | Balakrishnan et al. | |
| 2006/0074967 A1 | 4/2006 | Shaburov | |
| 2006/0080616 A1 | 4/2006 | Vogel et al. | |
| 2006/0116991 A1 | 6/2006 | Calderwood | |
| 2006/0129992 A1 | 6/2006 | Oberholtzer et al. | |
| 2006/0142949 A1 | 6/2006 | Helt | |
| 2006/0209085 A1 | 9/2006 | Wong et al. | |
| 2006/0271838 A1 | 11/2006 | Carro | |
| 2006/0271884 A1 | 11/2006 | Hurst | |
| 2006/0288046 A1 | 12/2006 | Gupta et al. | |
| 2007/0005582 A1 | 1/2007 | Navratil et al. | |
| 2007/0027851 A1 | 2/2007 | Kruy et al. | |
| 2007/0094248 A1 | 4/2007 | McVeigh et al. | |
| 2007/0113164 A1 | 5/2007 | Hansen et al. | |
| 2007/0150805 A1 | 6/2007 | Misovski | |
| 2007/0168336 A1 | 7/2007 | Ransil et al. | |
| 2007/0178501 A1 | 8/2007 | Rabinowitz et al. | |
| 2007/0192281 A1 | 8/2007 | Cradick et al. | |
| 2007/0260582 A1 | 11/2007 | Liang | |
| 2008/0126344 A1 | 5/2008 | Hoffman et al. | |
| 2008/0126951 A1 | 5/2008 | Sood et al. | |
| 2008/0155440 A1 | 6/2008 | Trevor et al. | |
| 2008/0196016 A1 | 8/2008 | Todd | |
| 2008/0201313 A1 | 8/2008 | Dettinger et al. | |
| 2008/0215543 A1 | 9/2008 | Huang et al. | |
| 2008/0267386 A1 | 10/2008 | Cooper | |
| 2008/0306957 A1 * | 12/2008 | Brown | G06F 16/10 |
| 2009/0006150 A1 | 1/2009 | Prigge et al. | |
| 2009/0007056 A1 | 1/2009 | Prigge et al. | |
| 2009/0043762 A1 | 2/2009 | Shiverick et al. | |
| 2009/0055487 A1 | 2/2009 | Moraes et al. | |
| 2009/0083275 A1 | 3/2009 | Jacob et al. | |
| 2009/0094217 A1 | 4/2009 | Dettinger et al. | |
| 2009/0144747 A1 | 6/2009 | Baker | |
| 2009/0161147 A1 | 6/2009 | Klave | |
| 2009/0172674 A1 | 7/2009 | Bobak et al. | |
| 2009/0182739 A1 * | 7/2009 | Crockett | G06Q 10/10 |
| 2009/0187556 A1 | 7/2009 | Ross et al. | |
| 2009/0193012 A1 | 7/2009 | Williams | |
| 2009/0199047 A1 | 8/2009 | Vaitheeswaran et al. | |
| 2009/0248721 A1 | 10/2009 | Burton et al. | |
| 2009/0282068 A1 | 11/2009 | Shockro et al. | |
| 2009/0299830 A1 | 12/2009 | West et al. | |
| 2010/0011282 A1 | 1/2010 | Dollard et al. | |
| 2010/0070464 A1 | 3/2010 | Aymeloglu et al. | |
| 2010/0073315 A1 | 3/2010 | Lee et al. | |
| 2010/0082671 A1 | 4/2010 | Li et al. | |
| 2010/0094822 A1 * | 4/2010 | Kelapure | G06F 16/16 707/705 |
| 2010/0145902 A1 | 6/2010 | Boyan et al. | |
| 2010/0161646 A1 | 6/2010 | Ceballos et al. | |
| 2010/0169376 A1 | 7/2010 | Chu | |
| 2010/0169405 A1 | 7/2010 | Zhang | |
| 2010/0199167 A1 | 8/2010 | Uematsu et al. | |
| 2010/0313119 A1 | 12/2010 | Baldwin et al. | |
| 2011/0035396 A1 | 2/2011 | Merz et al. | |
| 2011/0041084 A1 | 2/2011 | Karam | |
| 2011/0066497 A1 | 3/2011 | Gopinath et al. | |
| 2011/0074811 A1 | 3/2011 | Hanson et al. | |
| 2011/0093490 A1 | 4/2011 | Schindlauer et al. | |
| 2011/0131547 A1 | 6/2011 | Elaasar | |
| 2011/0145401 A1 | 6/2011 | Westlake | |
| 2011/0173149 A1 * | 7/2011 | Schon | G06F 16/24564 706/48 |
| 2011/0208822 A1 | 8/2011 | Rathod | |
| 2011/0252282 A1 | 10/2011 | Meek et al. | |
| 2011/0258216 A1 | 10/2011 | Supakkul et al. | |
| 2011/0270871 A1 | 11/2011 | He et al. | |
| 2011/0321008 A1 | 12/2011 | Jhoney et al. | |
| 2012/0078595 A1 | 3/2012 | Balandin et al. | |
| 2012/0102022 A1 | 4/2012 | Miranker et al. | |
| 2012/0159449 A1 | 6/2012 | Arnold et al. | |
| 2012/0173381 A1 | 7/2012 | Smith | |
| 2012/0174057 A1 | 7/2012 | Narendra et al. | |
| 2012/0188252 A1 | 7/2012 | Law | |
| 2012/0284719 A1 | 11/2012 | Phan et al. | |
| 2013/0024268 A1 | 1/2013 | Manickavelu | |
| 2013/0024731 A1 | 1/2013 | Shochat et al. | |
| 2013/0054551 A1 | 2/2013 | Lange | |
| 2013/0086482 A1 | 4/2013 | Parsons | |
| 2013/0096968 A1 | 4/2013 | Van Pelt et al. | |
| 2013/0198624 A1 | 8/2013 | Aymeloglu et al. | |
| 2013/0225212 A1 | 8/2013 | Khan | |
| 2013/0226944 A1 | 8/2013 | Baid et al. | |
| 2013/0232220 A1 | 9/2013 | Sampson | |
| 2013/0346455 A1 * | 12/2013 | Prasad | G06F 16/972 707/825 |

(56) References Cited

U.S. PATENT DOCUMENTS

| | | | |
|---|---|---|---|
| 2014/0012886 | A1 | 1/2014 | Downing et al. |
| 2014/0074888 | A1 | 3/2014 | Potter et al. |
| 2014/0101112 | A1* | 4/2014 | Bantivoglio, III .... G06F 16/215 707/691 |
| 2014/0108074 | A1 | 4/2014 | Miller et al. |
| 2014/0115589 | A1 | 4/2014 | Marinelli, III et al. |
| 2014/0115610 | A1 | 4/2014 | Marinelli, III et al. |
| 2014/0214579 | A1 | 7/2014 | Shen et al. |
| 2014/0244388 | A1 | 8/2014 | Manouchehri et al. |
| 2014/0279830 | A1* | 9/2014 | Majumdar ............ G06F 16/258 707/602 |
| 2015/0112641 | A1 | 4/2015 | Faraj |
| 2015/0269030 | A1 | 9/2015 | Fisher et al. |
| 2016/0026923 | A1 | 1/2016 | Erenrich et al. |
| 2016/0188701 | A1* | 6/2016 | Fapohunda ........... G06F 16/254 707/749 |
| 2016/0196307 | A1* | 7/2016 | Morozov ............ G06F 16/2462 707/694 |
| 2016/0210297 | A1* | 7/2016 | Francis ................. G06F 16/148 |
| 2017/0060859 | A1* | 3/2017 | Dejana .................. G06F 3/0608 |
| 2017/0099332 | A1* | 4/2017 | Bullotta .................. H04L 69/22 |
| 2017/0364570 | A1* | 12/2017 | Jacob .................. G06F 16/9024 |
| 2018/0352034 | A1* | 12/2018 | Mutreja ................ H04L 67/327 |
| 2018/0373786 | A1* | 12/2018 | Vora ....................... G06F 16/243 |

FOREIGN PATENT DOCUMENTS

| | | |
|---|---|---|
| EP | 2 634 745 | 9/2013 |
| EP | 2743839 | 6/2014 |
| EP | 2778986 | 9/2014 |
| EP | 2921975 | 9/2015 |
| GB | 2366498 | 3/2002 |
| GB | 2508503 | 1/2015 |
| GB | 2508293 | 4/2015 |
| HK | 1194178 | 9/2015 |
| NZ | 622485 | 3/2015 |
| NZ | 616212 | 5/2015 |
| NZ | 616299 | 7/2015 |
| WO | WO 2000/034895 | 6/2000 |
| WO | WO 2010/030917 | 3/2010 |
| WO | WO 2013/030595 | 3/2013 |

OTHER PUBLICATIONS

"A Tour of Pinboard," <http://pinboard.in/tour> as printed May 15, 2014 in 6 pages.
"The FASTA Program Package," fasta-36.3.4, Mar. 25, 2011, pp. 29.
"Java Remote Method Invocation: 7—Remote Object Activation," Dec. 31, 2010, retrieved from the internet Mar. 15, 2016 https://docs.oracle.com/javase/7/docs/platform/rmi/spec/rmi-activation2.html.
Alur et al., "Chapter 2: IBM InfoSphere DataStage Stages," IBM InfoSphere DataStage Data Flow and Job Design, Jul. 1, 2008, pp. 35-137.
Anonymous, "Frequently Asked Questions about Office Binder 97," http://web.archive.org/web/20100210112922/http://support.microsoft.com/kb/843147 printed Dec. 18, 2006 in 5 pages.
Bae et al., "Partitioning Algorithms for the Computation of Average Iceberg Queries," DaWaK 2000, LNCS 1874, pp. 276_286.
Ballesteros et al., "Batching: A Design Pattern for Efficient and Flexible Client/Server Interaction," Transactions on Pattern Languages of Programming, Springer Berlin Heildeberg, 2009, pp. 48-66.
Bogle et al., "Reducing Cross-Domain Call Overhead Using Batched Futures," SIGPLAN No. 29, 10 (Oct. 1994) pp. 341-354.
Bogle, Phillip Lee, "Reducing Cross-Domain Call Overhead Using Batched Futures," May 1994, Massachusetts Institute of Technology, pp. 96.
Bouajjani et al., "Analysis of Recursively Parallel Programs," PLDI09: Proceedings of the 2009 ACM SIGPLAN Conference on Programming Language Design and Implementation, Jun. 15-20, 2009, Dublin, Ireland, pp. 203-214.
Canese et al., "Chapter 2: PubMed: The Bibliographic Database," The NCBI Handbook, Oct. 2002, pp. 1-10.
Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.
Delcher et al., "Identifying Bacterial Genes and Endosymbiont DNA with Glimmer," BioInformatics, vol. 23, No. 6, 2007, pp. 673-679.
Delicious, <http://delicious.com/> as printed May 15, 2014 in 1 page.
Donjerkovic et al., "Probabilistic Optimization of Top N Queries," Proceedings of the 25th VLDB Conference, Edinburgh, Scotland, 1999, pp. 411-422.
Fang et al., "Computing Iceberg Queries Efficiently," Proceedings of the 24th VLDB Conference New York, 1998, pp. 299-310.
Frantisek et al., "An Architectural View of Distributed Objects and Components in CORBA, Java RMI and COM/DCOM," Software—Concepts & Tools, vol. 19, No. 1, Jun. 1, 1998, pp. 14-28.
Goldstein et al., "Stacks Lazy Threads: Implementing a Fast Parallel Call," Journal of Parallel and Distributed Computing, Jan. 1, 1996, pp. 5-20.
Han et al., "Efficient Computation of Iceberg Cubes with Complex Measures," ACM Sigmod, May 21-24, 2001, pp. 1-12.
Ivanova et al., "An Architecture for Recycling Intermediates in a Column-Store," Proceedings of the 35th Sigmod International Conference on Management of Data, Sigmod '09, Jun. 29, 2009, p. 309.
Jacques, M., "An extensible math expression parser with plug-ins," Code Project, Mar. 13, 2008. Retrieved on Jan. 30, 2015 from the internet: <http://www.codeproject.com/Articles/7335/An-extensible-math-expression-parser-with-plug-ins>.
Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Karp et al., "A Simple Algorithm for Finding Frequent Elements in Streams and Bags," ACM Transactions on Database Systems, vol. 28, No. 1, Mar. 2003, pp. 51Ð55.
Kitts, Paul, "Chapter 14: Genome Assembly and Annotation Process," The NCBI Handbook, Oct. 2002, pp. 1-21.
Leela et al., "On Incorporating Iceberg Queries in Query Processors," Technical Report, TR-2002-01, Database Systems for Advanced Applications Lecture Notes in Computer Science, 2004, vol. 2973.
Liu et al., "Methods for Mining Frequent Items in Data Streams: An Overview," Knowledge and Information Systems, vol. 26, No. 1, Jan. 2011, pp. 1-30.
Madden, Tom, "Chapter 16: The BLAST Sequence Analysis Tool," The NCBI Handbook, Oct. 2002, pp. 1-15.
Mendes et al., "TcruziKB: Enabling Complex Queries for Genomic Data Exploration," IEEE International Conference on Semantic Computing, Aug. 2008, pp. 432-439.
Mizrachi, Ilene, "Chapter 1: GenBank: The Nuckeotide Sequence Database," The NCBI Handbook, Oct. 2002, pp. 1-14.
Russell et al., "NITELIGHT: A Graphical Tool for Semantic Query Construction," 2008, pp. 10.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Smart et al., "A Visual Approach to Semantic Query Design Using a Web-Based Graphical Query Designer," 16th International Conference on Knowledge Engineering and Knowledge Management (EKAW 2008),ÊAcitrezza, Catania, Italy, Sep.Ê29-Oct. 3, 2008, pp. 16.
Stamos et al., "Remote Evaluation," Journal ACM Transactions on Programming Languages and Systems (TOPLAS) vol. 12, Issue 4, Oct. 1990, pp. 537-564.
Wikipedia, "Machine Code", p. 1-5, printed Aug. 11, 2014.

(56) References Cited

OTHER PUBLICATIONS

Wollrath et al., "A Distributed Object Model for the Java System," Proceedings of the 2nd Conference on USENEX, Conference on Object-Oriented Technologies (COOTS), Jun. 17, 1996, pp. 219-231.

* cited by examiner

VALIDATING DATA FOR INTEGRATION

FIELD OF THE INVENTION

This disclosure relates to validating data for integration into datasets.

BACKGROUND

Under conventional approaches, various types of data may be obtained for integration into particular datasets. Different types of data may require different types of data transformations (e.g., extraction, processing, manipulation, modification, enhancement, combination) to be integrated into particular datasets. Validating data for integration into particular datasets may ensure that the data is routed properly to appropriate datasets.

SUMMARY

Various embodiments of the present disclosure may include systems, methods, and non-transitory computer readable media configured to validate data for integration. A file to be integrated into a dataset may be determined. The file may be characterized by a file name and metadata. Whether the dataset can be identified based on the file name and the metadata may be determined. Responsive to the dataset not being identifiable, information needed to identify the dataset may be requested. Responsive to the dataset being identifiable, the file may be routed for integration into the dataset.

In some embodiments, at least some of the metadata may be identified based on parsing the file name. In some embodiments, the file may include binary data, and at least some of the metadata may be identified based on decoding a portion of the binary data.

In some embodiments, requesting the information needed to identify the dataset may include displaying the information needed to identify the dataset within a file integration interface. In some embodiments, the file integration interface may provide a preview of the file. In some embodiments, the file integration interface may provide a view of information used to identify the dataset. In some embodiments, the file integration interface may enable a user to change the information used to identify the dataset.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

A claimed solution rooted in computer technology overcomes problems specifically arising in the realm of computer technology. In various implementations, a computing system may determine (e.g., based on user upload, system download) a file to be integrated into a dataset. The file may be characterized by a file name and metadata. In some embodiments, at least some of the metadata may be identified by processing other information. For example, at least some of the metadata may be identified based on parsing the file name. As another example, the file may include binary data, and at least some of the metadata may be identified based on decoding a portion of the binary data. The computing system may determine whether the dataset can be identified based on the file name and the metadata. Based on the dataset not being identifiable, the computing system may request information needed to identify the dataset. Requesting the information needed to identify the dataset may include displaying such information within a file integration interface. The file integration interface may provide other functionalities, such as receiving the file to be integrated into a dataset (e.g., via drag and drop of the file into the interface, via adding option in the interface), providing a preview of the file (e.g., preview of a binary file based on partial decoding), providing a view of information used to identify the dataset, and/or enabling a user to change the information used to identify the dataset. Based on the dataset being identifiable, the computing system may route the file for integration into the dataset. For example, the file integration interface may provide an option for a user to process/route a single file or multiple files (batch processing) for integration into the appropriate dataset(s).

The approach disclosed herein enables input validation for data before the data is integrated/routed for integration into a dataset. Input validation may prevent users from integrating improper data into datasets. Input validation may ensure that a file that is received by a computing system for integration into a dataset conforms to one or more validation rules. Validation rules may be based on one or more of file type/format, file name/file naming convention, presence of particular metadata, and/or other information. Validation rules may provide for multiple routing of files/data for integration into different datasets. The approach disclosed herein enables user input to receive information for input validation, categorization of different files/raw sources from which integration pipelines may be built, and transparent routing of data to appropriate dataset(s).

Figure 1:
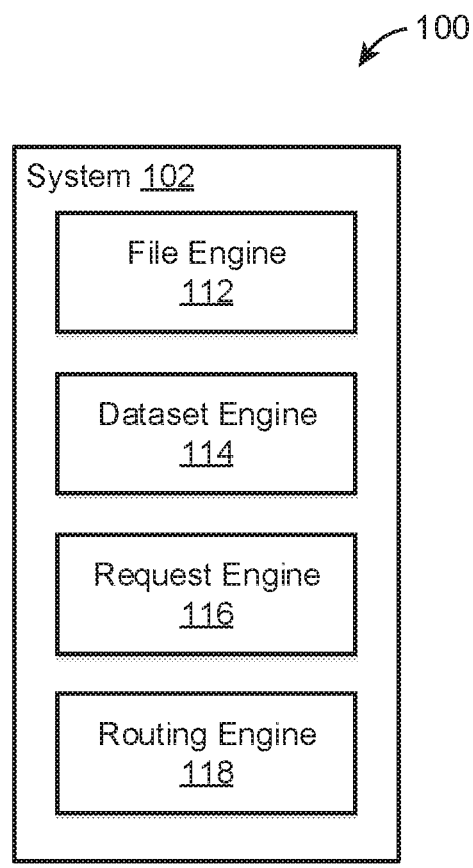
FIG. 1 illustrates an example environment for validating data for integration, in accordance with various embodiments.

FIG. 1 illustrates an example environment 100 for validating data for integration, in accordance with various embodiments. The example environment 100 may include a computing system 102. The computing system 102 may include one or more processors and memory (e.g., permanent memory, temporary memory). The processor(s) may be configured to perform various operations by interpreting machine-readable instructions stored in the memory. As shown in FIG. 1, in various embodiments, the computing system 102 may include a file engine 112, a dataset engine 114, a request engine 116, and a routing engine 118. The environment 100 may also include one or more datastores that is accessible to the computing system 102 (e.g., via one or more network(s)). In some embodiments, the datastore(s) may include various databases, application functionalities, application/data packages, and/or other data that are available for download, installation, and/or execution. While the computing system 102 is shown in FIG. 1 as a single entity, this is merely for ease of reference and is not meant to be limiting. One or more components/functionalities of the computing system 102 described herein may be implemented in a single computing device or multiple computing devices.

In various embodiments, the file engine 112 may be configured to determine a file to be integrated into one or more datasets. A dataset may refer to a collection of information that includes multiple data elements organized into a particular structure and/or using a particular format. A dataset may be included within a database or multiple databases. Data elements of a dataset may be accessed individually or in combination by a data analysis platform. A data analysis platform may refer to hardware/software components configured to provide analysis capabilities for data (e.g., database analysis tool). A data analysis platform may require data (e.g., data elements, datasets) to be stored using a particular structure/format and/or include one or more particular types of information.

A file to be integrated into the dataset may be determined (e.g., identified) by the file engine 112 based on reception/identification of the file by the computing system 102 and/or reception/identification of the file by a network/server/computing device monitored by the computing system 102. For example, a user may upload a given file to the computing system 102 or a network/server/computing device monitored by the computing system 102 via an interface (e.g., a file integration interface) that receives inputs (e.g., via an upload/import button, via drag-and-drop) for a dataset/data analysis platform. The file engine 112 may determine that the given file is to be integrated into a dataset based on the user's use of the interface to upload the given file. As another example, a user may use the computing system 102 or a network/server/computing device monitored by the computing system 102 to select a particular file for integration into a dataset. The file engine 112 may determine that a particular file is to be integrated into a dataset based on the user's selection of the particular file.

In some embodiments, a file to be integrated into a dataset may include an archive file. An archive file may refer to a file that includes a collection multiple files in a single file (e.g., zip file, rar file, 7z file, tar file, jar file, war file). An archive file may provide for concatenation of files, compression of files, encryption of files, error detection of files, self-extraction of files, and/or other operations relating to archiving of files. An archive file may include information (e.g., metadata) relating to the files within the archive file and/or how the files within the archive file may be extracted.

In some embodiments, the file engine 112 may be configured to determine that a file to be integrated into a dataset is an archive file. The file engine 112 may determine that the file is an archive file based on file format (e.g., file extension), analysis of the file (e.g., analysis of structure, pattern within the file), user input (e.g., user indication that the file is an archive file during file upload/selection for integration), information (e.g., metadata) relating to the file, and/or other information. Based on the file to be integrated into a dataset being an archive file, the file engine 112 may extract the files within the archive file for integration into one or more datasets.

A file to be ingested into a dataset may be characterized by a file name, metadata, and/or other information. Information contained within the file name and/or metadata may be used to identify the dataset(s) to which the file is to be integrated. A file name may refer to an identifier/identifying name of the file. A file name may be required to conform to one or more particular file naming conventions. A file naming convention may provide a framework for naming a file to describe data contained within the file, how the file relates to other files, and/or other information which may be used to identify the dataset(s) to which the file is to be integrated. For example, a file naming convention may restrict the length of a file name and/or provide for the types of characters which may be allowed within the file name. For example, a file name of a file to be ingested into a dataset may be limited to a particular or ranges of lengths. As another example, certain types of characters may be required/not allowed within one or more portions of the file name.

Metadata may refer to one or more sets of data that describes and/or provides information about the file. Metadata may be contained within the file and/or with one or more other files associated with the file. In some embodiments, metadata may be contained within the file name. Including metadata within the file name may enable efficient provision of information about the dataset(s) to which the file is to be integrated, such as for files for which metadata in addition to the file (e.g., appending metadata to a portion of the file) may be difficult to provide and/or not desired. For example, the file to be integrated may include binary data and the file name of the binary data may provide information to identify the dataset(s) to which the binary data is to be integrated.

For example, a file to be integrated may include binary data output by one or more sensors. The file name of the file may be formatted to include information about the file, such as the type/format of the data (e.g., type/format of sensor data), specifics relating to the data (e.g., sub-type, sensor channel), location(s) of the data, object(s) to which the data relates, date(s)/time(s) of the data, user/organization, and/or other information which may be used to identify the dataset(s) to which the file is to be integrated. In some embodiments, the format of the file (e.g., whether the file includes/is included within an archive file) may be used to identify the dataset(s) to which the file is to be integrated.

In some embodiments, one or more metadata/characteristics/properties of the file relating to its integration into a dataset may be defined when the user uploads/selects the file for integration. For example, the user may define one or more metadata/characteristics/properties of the file when uploading the file through an interface (e.g., a file integration interface). Such information may be used to determine that the file is to be integrated into a dataset and/or identify the dataset to which the file is to be integrated.

In various embodiments, the dataset engine 114 may be configured to determine whether the dataset(s) to which the file is to be integrated can be identified. Determining whether the dataset(s) to which the file is to be integrated can be identified may include determining whether sufficient information is included in the file name, the metadata, and/or other information associated with the file. Determining whether the dataset(s) to which the file is to be integrated can be identified may include attempting to identify such dataset(s). Responsive to the dataset(s) being identified, it may be determined that the dataset(s) can be identified. Responsive to the dataset(s) not being identified, it may be determined that the dataset(s) cannot be identified The dataset(s) to which the file is to be integrated may be identified based on the file name, the metadata, and/or other information. Determining whether the dataset(s) to which the file is to be integrated can be identified may provide input validation for files. Input validation may prevent users from integrating improper data into one or more datasets, which may be reserved for one or more specific purposes. Input validation may ensure that a file that is received by a computing system for integration into a dataset conforms to one or more validation rules. Validation rules may be based on one or more of file type/format, file name/file naming convention, presence of metadata, and/or other information. Validation rules may provide for multiple routing of files/data for integration into one or more datasets. Based on different validation rules being met (e.g., by file name, metadata extracted from the file/file name), different destinations (particular dataset(s)) for different files may be determined. Application of validation rules to a file may be determined at once (e.g., a single/combined processing to determine whether the dataset(s) may be identified) or through stages (e.g., multi-pass processing to determine whether the dataset(s) may be identified). The validations rules may be accessed/obtained by the dataset engine 114 from one or more locations and/or integrated into the dataset engine 114. The validation rules may be static or dynamic (e.g., rules which must be met may change based on the information contained within the file name and/or metadata). In some embodiments, one or more of the validation rules may be changed (e.g., via system update, via user input).

In some embodiments, the dataset engine 114 may determine whether the dataset(s) to which a file is to be integrated can be identified based on parsing the file name of the file. For example, the dataset engine 114 may parse the file name of the file to determine/identify the file type/type of data contained within the file (e.g., type/format of sensor data), specifics relating to the file/data contained within the file (e.g., sub-type, sensor channel), location(s) to which the data contained within the file relates, object(s) to which the data contained within the file relates, date(s)/time(s) of the data contained within the file, user/organization associated with the file, and/or other information which may be used to identify the dataset(s) to which the file is to be integrated.

For a binary file (file including binary data), at least some of the metadata (for identifying the dataset(s) to which the file is to be integrated), may be determined/identified based on decoding one or more portions of the binary data. For example, the first portion of the file (e.g., the first binary portion of a certain size) may be streamed and decoded. The decoded information may be analyzed to determine the metadata embedded within the file and/or to validate/identify the data contained within the file. In some embodiments, processing of the binary data within the file may be separate (e.g., performed in a separate pass) from parsing the file name for identifying the dataset(s).

If the dataset(s) to which a file is to be integrated cannot be identified, the file may be designated as a non-integratable file. For example, the file may be tagged/marked as a file which cannot be routed for integration into a dataset.

In various embodiments, the request engine 116 may be configured to, responsive to the dataset not being identifiable (by the dataset engine 114), request information needed to identify the dataset. The request engine 116 may identify and request from a user/system the information needed to identify the dataset to which the file is to be integrated. In some embodiments, a particular set of information may be required to identify the dataset into which the file is to be integrated. The request engine 116 may identify, among the particular set of information, which information has not been provided by the file name, the metadata, and/or other information associated with the file (e.g., provided via user input). In some embodiments, the information required to identify the dataset may be dynamically determined/managed. That is, the information required to identify the dataset may change based on the information provided by the file name, the metadata, and other information associated with the file (e.g., based on having information of type A about a file, the request engine 116 may request information of types B and C; based on having information of type D about a file, the request engine 116 may request information of types E). In some embodiments, the request engine 116 may request the information needed to identify the dataset through one or more user interfaces. Such user interfaces may be referred to as a file integration interface.

In some embodiments, the request engine 116 may provide one or more alerts indicating that the dataset for the file could not be identified. For example, an error icon, a status indicator, an error message, and/or other visuals may be displayed (e.g., within a file integration interface) for the file for which the dataset could not be identified. The error icon may indicate (based on shape and/or color) that the dataset could not be identified (e.g., the file could not be validated for integration) based on the file name and/or the metadata. The status indicator may state the current status of the file-whether the dataset can be/has been identified (e.g., the file was validated for integration), whether the dataset cannot/has not be identified (e.g., the file has not been validated), whether the file has been integrated into the dataset, and/or other status identifying descriptions regarding the file. The error message may display one or more reasons why the dataset could not be identified, which information has been properly received/processed to identify the dataset, and/or other information relating to identifying the dataset for the file. In some embodiments, the error message may be displayed in response to a user interacting with one or more portions of the file integration interface. For example, the error message may be displayed in response to a user clicking on/hovering over the error icon or the status indicator.

In some embodiments, the request engine 116 may request the information needed to identify the dataset by displaying the information needed to identify the dataset within the file integration interface. For example, the information used/needed to identify the dataset may be displayed within the error message and/or other visuals presented through the file integration interface. In some embodiments, the information used/needed to identify the dataset may be displayed in response to a user's interaction with one or more portions of the file integration interface. For example, the file integration interface may include one or more options through which information about individual files may be presented. Based on a user's interaction with such options, the file integration interface may display the information used/needed to identify the dataset. The file integration interface may enable a user to change one or more of information used/needed to identify the dataset. For example, the file integration interface may enable a user add a particular property/attribute of the file, which was not included in the file name or the metadata of the file, and/or change a particular property/attribute of the file extracted from the file name or the metadata of the file. Such information may be part of the information used/needed to identify the dataset. In some embodiments, the request engine 116 may persist the user added/changed information for a file by making changes to the file name and/or the metadata of the file.

In some embodiments, the file integration interface may provide other views/options relating to the files. For example, the file integration interface may provide a listing of other files that have been determined to be integrated into one or more datasets and/or other files that have been integrated into one or more datasets. For example, the file integration interface may provide a listing of (1) files to be integrated (e.g., files uploaded for integration), and (2) files that have been integrated into their respective datasets (e.g., files previously uploaded and integrated into datasets). The file integration interface may provide information about the integrated files (such as when the file was received for integration, when the file was integrated, into what dataset the file was integrated, where the dataset is located) and/or may provide options for a user to view/retrieve (e.g., download) previously integrated files. Options to retrieve previously integrated files may include options to retrieve the raw version of the file that was received for integration and/or the transformed version of the file that was integrated into the datasets.

As another example, the file integration interface may provide one or more previews of a file. A preview of a file may include a view of some or all of raw data contained within the file, a view of some or all of data contained within the file that have been processed (e.g., decoded, transformed), and/or other views of the file. For example, data contained within a file may be processed, formatted in one or more charts, graphically rendered, and/or presented for viewing. In some embodiments, the processing of the file may be performed by the same or similar operations used to integrate the file into its dataset(s). A user may use a preview of a file to view and/or confirm its contents before the file is routed for integration into its dataset(s). Provision of other views/options relating to the files are contemplated.

In various embodiments, the routing engine 118 may be configured to, responsive to the dataset(s) being identifiable, route the file for integration into the dataset(s). Routing a file for integration into a dataset may include providing/passing the file to one or more processes/services/computing systems that performs the integration and/or marking/tagging the file to be provided/passed to such processes/services/computing systems. Integration of the file into dataset(s) may include transformation (e.g., extraction, processing, manipulation, modification, enhancement, combination) of data contained in the file by one or more operations. One or more such operations may be arranged within a pipeline of operations for integrating files into datasets.

For example, responsive to a given dataset being identified as the dataset to which the file is to be integrated, the routing engine 118 may prompt a user to confirm the routing of the file for integration into the given dataset. Based on the user's confirmation, the file may be routed for integration into the given dataset. For example, the file integration interface may provide one or more options for a user to process/route a single file or multiple files, for which the dataset(s) have been identified, for integration into the appropriate dataset(s). In some embodiments, the file integration interface may provide one or more messages indicating a file is ready to be integrated into its dataset(s). In some embodiments, one or more confirmations (e.g., via the file integration interface, via electronic message, such as email) regarding the file/status of the file may be provided to one or more users/computing systems (e.g., user/computing system that provided the file, user/system that integrates the file into the dataset(s)). In some embodiments, the file integration interface may enable a user to reattempt an integration of a file based on a failure of a prior attempt to integrate the file into its dataset(s).

Figure 2:
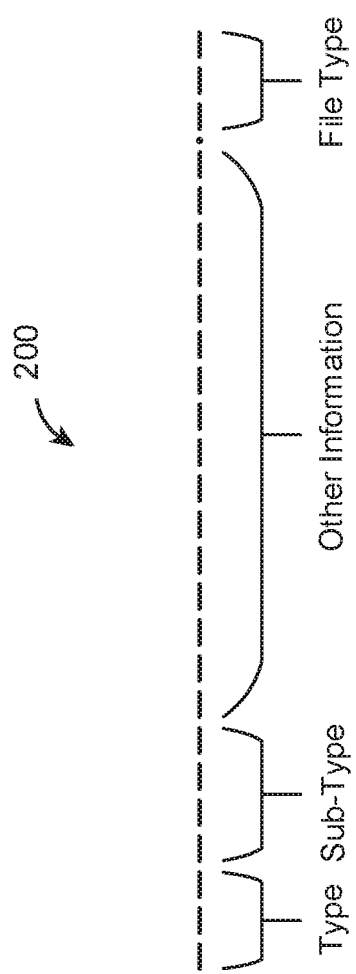
FIG. 2 illustrates an example file naming convention for validating data for integration, in accordance with various embodiments.

FIG. 2 illustrates an example file naming convention 200 for a file to be integrated into a dataset. The file naming convention 200 may provide a framework for naming a file to describe data contained within the file, how the file relates to other files, and/or other information which may be used to identify the dataset(s) to which the file is to be integrated. The file naming convention 200 is provided merely as an example and, naturally, the arrangement and configuration of file naming convention may vary depending on the implementation. Thus, depending on the implementation, the file naming convention may include additional, alternative, and/or different structures.

The file naming convention 200 may split a file name into multiple sections. For example, as shown in FIG. 2, the file naming convention 200 may split a file name into four sections: (1) type, (2) sub-type, (3) other information, and (4) file type. The type section of the file naming convention 200 may define the type/format of the data contained within the file. The sub-type section of the file naming convention 200 may define a more detailed information about the data type/specifics relating to the data contained within the file. The other information section of the file naming convention 200 may define other information used to identify the dataset(s) to which the file is to be integrated. For example, the other information section of the file naming convention 200 may define one or more of location(s) of the data, object(s) to which the data relates, date(s)/time(s) of the data (e.g., start date/time, end date/time), user/organization, and/or other information which may be used to identify the dataset(s) to which the file is to be integrated. The other information section of the file naming convention 200 may be sub-divided. The file type of the file naming convention 200 may define the format of the file (e.g., whether the file includes/is included within an archive file).

In some embodiments, different sections of the file naming convention 200 may be restricted to a certain length/number of characters. In some embodiments, different sections of the file naming convention 200 may provide for the types of characters which may be allowed within the different sections. In some embodiments, different sections of the file naming convention 200 may be separated by one or more characters (e.g., separated by a dash "-"). Other file naming conventions for use in validating data for integration are contemplated.

Figure 3:
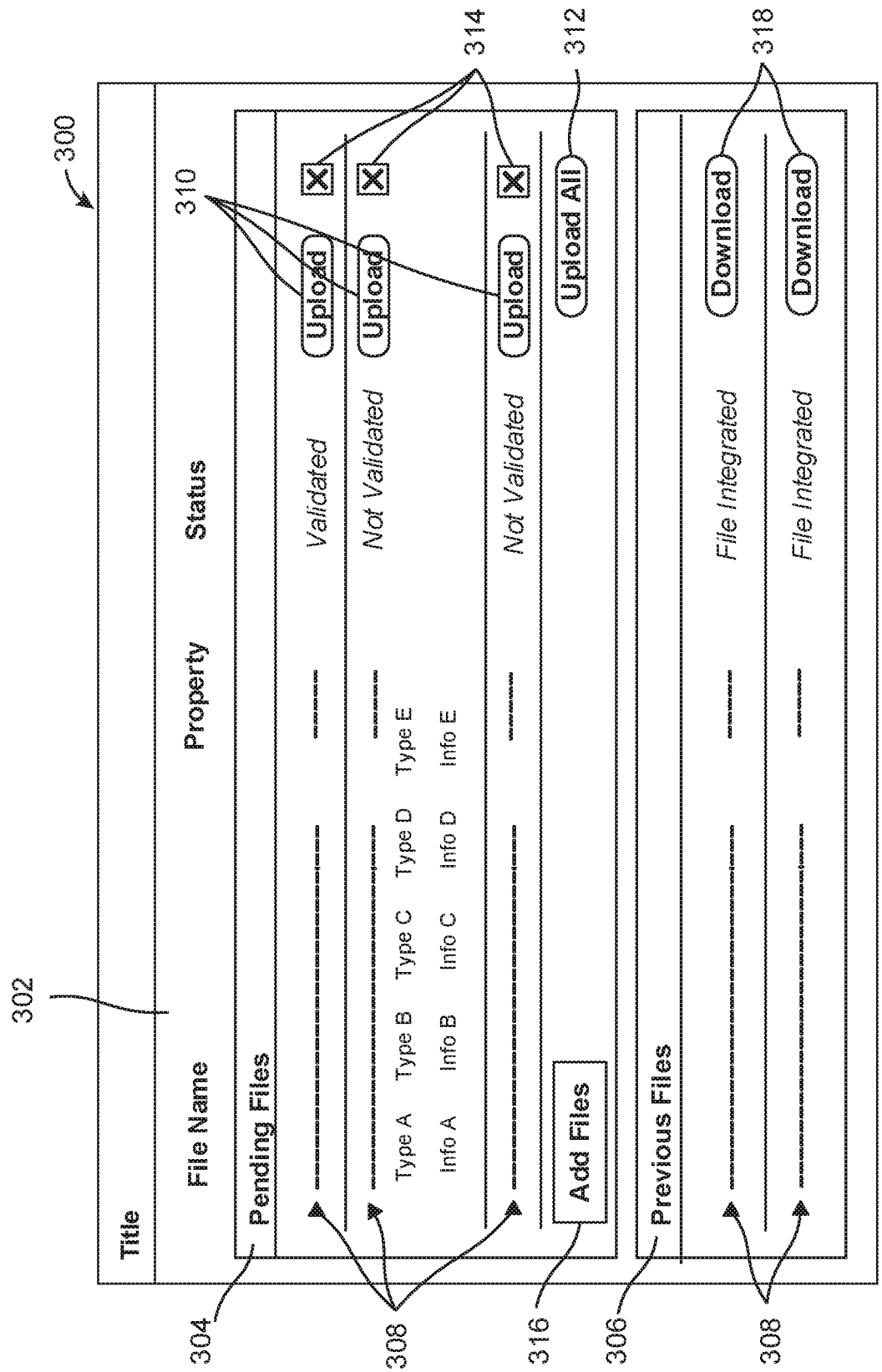
FIG. 3 illustrates an example user interface for validating data for integration, in accordance with various embodiments.

FIG. 3 illustrates an example user interface 300 for integrating a file into a dataset. In various embodiments, the user interface 300 may be accessed through a software application running on a computing device (e.g., computers, mobile phones, tablets, etc.) that includes one or more processors and memory. For example, the user interface 300 may be accessible through a web browser. In another example, the user interface 300 may be provided through a data analysis application. In yet another example, the user interface 300 may be provided as a service over a network (e.g., software as a service). Depending on the computing device, the user may be able to interact with the user interface 300 using various input devices (e.g., keyboard, mouse, etc.) and/or touch/gestures. The user interface 300 is provided merely as an example and, naturally, the arrangement and configuration of such user interfaces can vary depending on the implementation. Thus, depending on the implementation, the user interface 300 may include additional features and/or alternative features. The user interface 300 may include/enable one or more functionalities of the interface(s) described above with respect to the computing system 102/components of the computing system 102.

The user interface 300 may include an organization section 302, a pending files section 304, and previous files section 306. The organization section 302 may provide descriptions of information provided within the pending files section 304 and the previous files section 306, such as file name, property of the file (e.g., size, user, organization, one or more information contained within filename/metadata of the file), status of the file, and/or other descriptions. In some embodiments, a user may interact with the organization section 302 to display different types of descriptions, change the ordering of the descriptions, and/or sort the listings of files within the pending files section 304 and the previous files section 306 based on one or more of the descriptions within the organization section 302.

The pending files section 304 may provide a listing of files that are to be integrated into one or more datasets. The pending files section 304 may display information on whether the files are ready to be integrated into the datasets. For example, the status of the respective files may indicate that the files are ready to be integrated into their respective dataset(s) by displaying the term "validated" or other terms/ words, and may indicate that the files are not ready to be integrated into their respective dataset(s) by displaying the term "not validated" or other terms/words. The pending files section 304 may display information on whether the files are ready to be integrated into the datasets using icons (e.g., ready icon, error icon), messages (e.g., ready message, error message), and/or other visuals. For example, an error message may display one or more reasons why the dataset could not be identified, which information has been properly received/processed to identify the dataset, and/or other information relating to identifying the dataset for the file. In some embodiments, the error message may be displayed in response to a user interacting with one or more portions of the user interface 300. For example, the error message may be displayed in response to a user clicking on/hovering over an error icon or a status for a file.

The user interface 300 may display information used/ needed to identify the dataset(s) to which a file is to be integrated. For example, the information used/needed to identify the dataset(s) may be displayed within the error message and/or other visuals presented through the user interface 300. In some embodiments, the information used/ needed to identify the dataset(s) may be displayed in response to a user's interaction with one or more portions of the user interface 300. For example, the user interface 300 may include options 308 through which information about individual files may be presented. Based on a user's interaction with the options 308, the user interface 300 may display (e.g., below the file name) the information used/ needed to identify the dataset(s).

The user interface 300 may enable a user to change one or more of information used/needed to identify the dataset(s). For example, the user interface 300 may enable a user add a particular property/attribute of the file, which was not included in the file name or the metadata of the file, and/or change a particular property/attribute of the file extracted from the file name or the metadata of the file. For example, a user may click on a particular information (e.g., Info A, Info B, Info C, Info D, Info E) and define/change the particular information. In some embodiments, the user interface 300 may provide suggestions for a user's changing of information. For example, responsive to a user's clicking on the term "Info A," the user interface 300 may provide a dropdown menu from which particular information may be selected by the user and/or the user interface 300 may prefill/suggest particular information to be used for "Info A." In some embodiments, the user added/changed information for a file may be persisted through changes to the file name and/or the metadata of the file.

The user interface 300 may provide options 310 for a user to process/route individual files for integration into the appropriate dataset(s). The user interface 300 may provide an option 312 for a user to process/route multiple files (batch processing) for integration into the appropriate dataset(s). In some embodiments, one or more of the options 310, 312 may be deactivated (e.g., greyed-out) in response to one or more of the files not being validated for integration. In some embodiments, one or more users (e.g., administrative users) may be provided with an option to force integrate (e.g., force upload/process for integration) a file into its dataset(s). The user interface 300 may provide options 314 for a user to remove files from dataset integration.

The user interface 300 may provide an option 316 for a user to add files for integration into dataset(s). In some embodiments, a user may add files for integration into dataset(s) by dragging and dropping the files to one or more portions of the user interface 300 (e.g., dragging and dropping file into the pending files section 304). In some embodiments, one or more metadata/characteristics/properties of a file relating to its integration into dataset(s) may be defined when a user adds the file for integration. Such information may be used to determine that the file is to be integrated into a dataset and/or identify the dataset(s) to which the file is to be integrated.

The previous files section 306 may provide a listing of files that have been integrated into one or more datasets. The status of the files listed in the previous files section 306 may indicate that the files have been integrated into dataset(s) (e.g., via the term "file integrated," or other terms/words). The status of the files may provide other information about the individual files, such as the identification of the dataset(s) to which the file was integrated, the location of the dataset(s), where the file was received, when the file was received, when the file was integrated, and/or other information. The user interface 300 may provide options 318 for a user to view/retrieve (e.g., download) previously integrated files. The options 308 may enable a user to retrieve the raw version of the file that was received for integration and/or the transformed version of the file that was integrated into the dataset(s).

Figure 4:
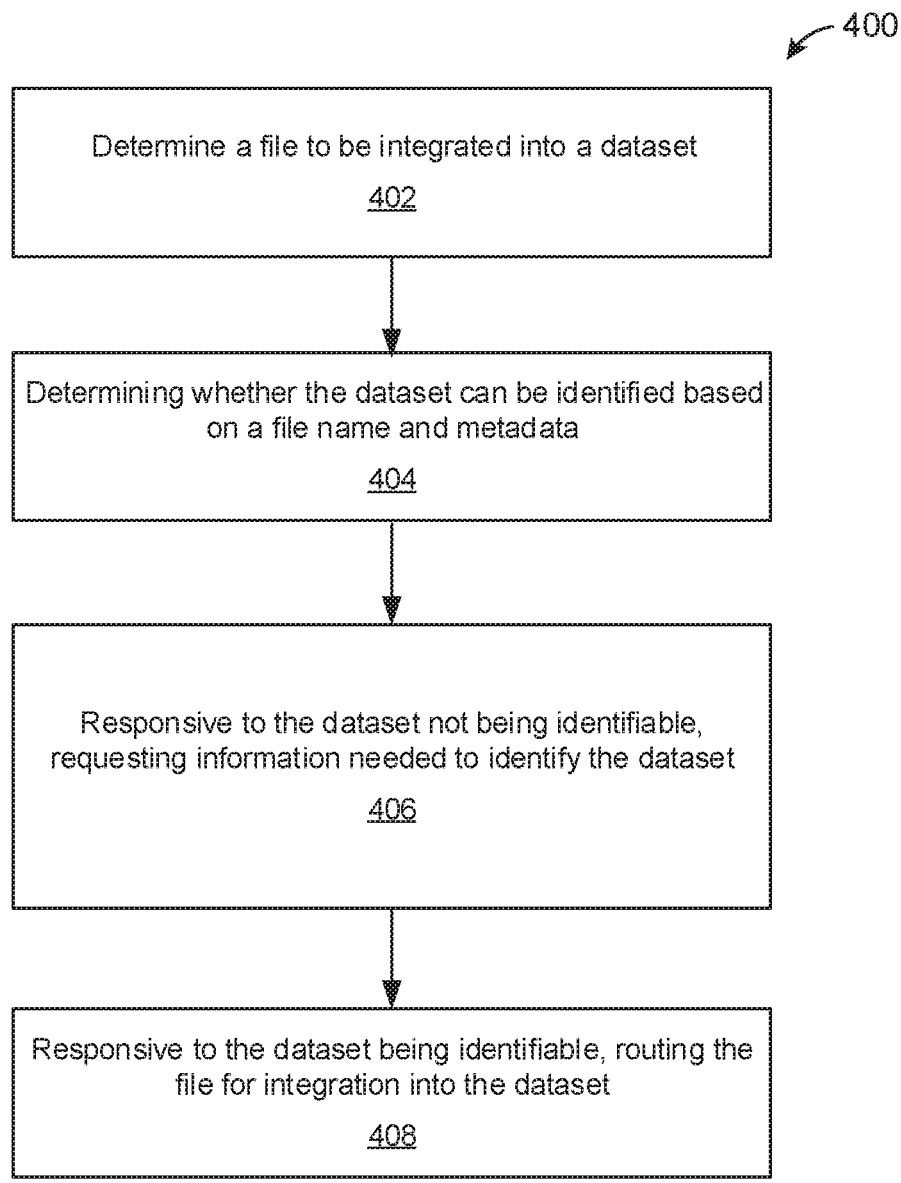
FIG. 4 illustrates a flowchart of an example method, in accordance with various embodiments.

FIG. 4 illustrates a flowchart of an example method 400, according to various embodiments of the present disclosure. The method 400 may be implemented in various environments including, for example, the environment 100 of FIG. 1. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, a file to be integrated into a dataset may be determined. The file may be characterized by a file name and metadata. At block 404, whether the dataset can be identified based on the file name and the metadata may be determined. At block 406, responsive to the dataset not being identifiable, information needed to identify the dataset may be requested. At block 408, responsive to the dataset being identifiable, the file may be routed for integration into the dataset.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
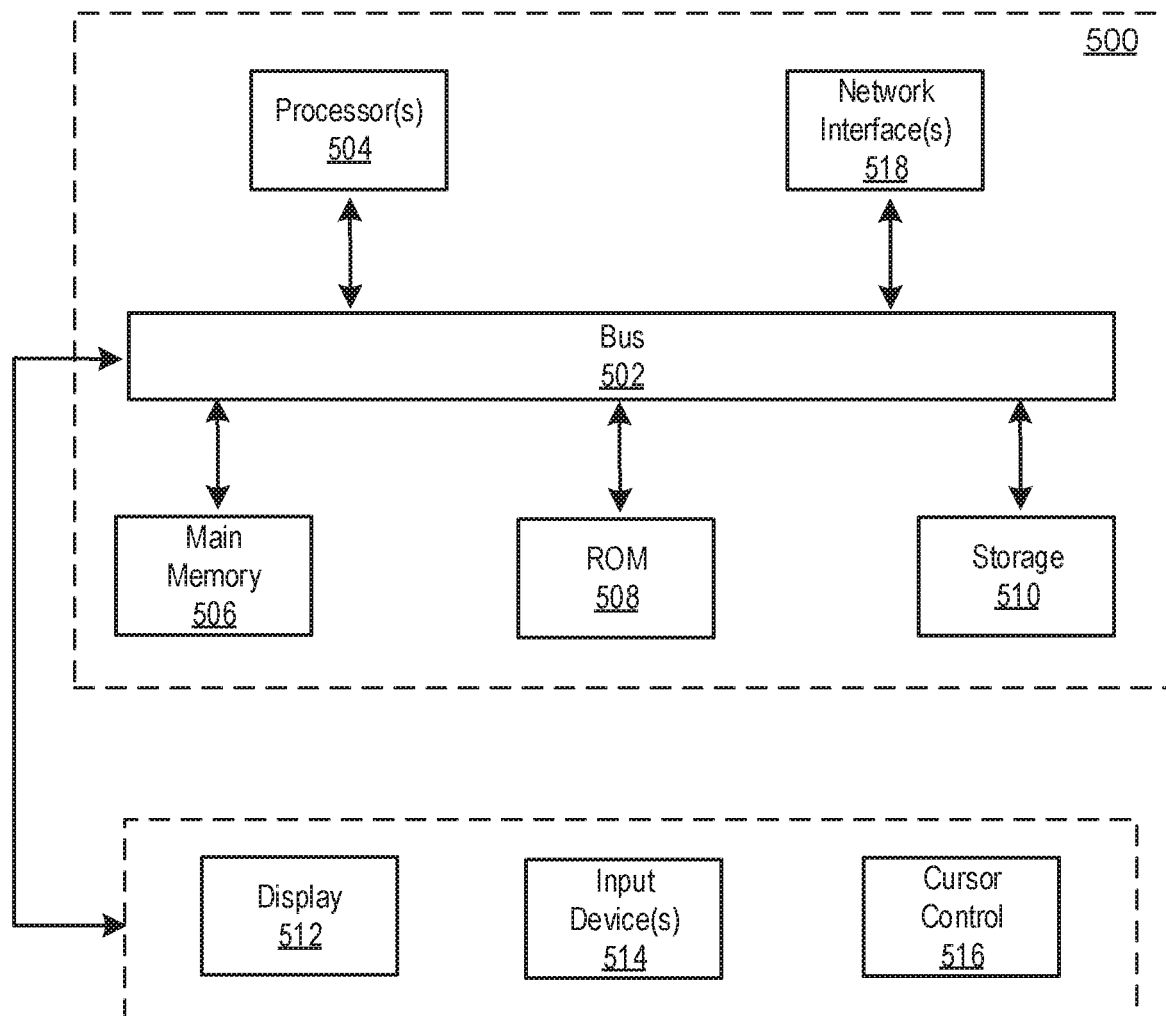
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:
1. A system comprising:
one or more processors; and
memory storing instructions that, when executed by the one or more processors, cause the system to perform:
determining a file to be integrated into a dataset, the file characterized by a file name and metadata;
determining that at least one of the file name or the metadata comprises first partial information for identifying the dataset;
determining that the dataset is not identifiable based solely on the first partial information;
responsive to the dataset not being identifiable based solely on the first partial information, dynamically determining that second partial information indicative of one or more attributes of the file that are not determinable from the file name or the metadata is needed to identify the dataset;
responsive to dynamically determining that the second partial information is needed to identify the dataset, requesting the second partial information;
receiving the second partial information;
determining that the dataset is identifiable based on the combination of the first partial information and the second partial information; and responsive to the dataset being identifiable based on the combination of the first partial information and the second partial information, routing the file for integration into the dataset.

2. The system of claim 1, wherein at least some of the metadata is identified based on parsing the file name.

3. The system of claim 1, wherein the file includes binary data, and at least some of the metadata is identified based on decoding a portion of the binary data.

4. The system of claim 1, wherein requesting the information needed to identify the dataset includes displaying the information needed to identify the dataset within a file integration interface.

5. The system of claim 4, wherein the file integration interface provides a preview of the file.

6. The system of claim 4, wherein the file integration interface provides a view of information used to identify the dataset.

7. The system of claim 6, wherein the file integration interface enables a user to change the information used to identify the dataset.

8. A method implemented by a computing system including one or more processors and storage media storing machine-readable instructions, wherein the method is performed using the one or more processors, the method comprising:
    determining a file to be integrated into a dataset, the file characterized by a file name and metadata;
    determining that at least one of the file name or the metadata comprises first partial information for identifying the dataset;
    determining that the dataset is not identifiable based solely on the first partial information;
    responsive to the dataset not being identifiable based solely on the first partial information, dynamically determining that second partial information indicative of one or more attributes of the file that are not determinable from the file name or the metadata is needed to identify the dataset;
    responsive to dynamically determining that the second partial information is needed to identify the dataset, requesting the second partial information;
    receiving the second partial information;
    determining that the dataset is identifiable based on the combination of the first partial information and the second partial information; and
    responsive to the dataset being identifiable based on the combination of the first partial information and the second partial information, routing the for integration into the dataset.

9. The method of claim 8, wherein at least some of the metadata is identified based on parsing the file name.

10. The method of claim 8, wherein the file includes binary data, and at least some of the metadata is identified based on decoding a portion of the binary data.

11. The method of claim 8, wherein requesting the information needed to identify the dataset includes displaying the information needed to identify the dataset within a file integration interface.

12. The method of claim 11, wherein the file integration interface provides a preview of the file.

13. The method of claim 11, wherein the file integration interface provides a view of information used to identify the dataset.

14. The method of claim 13, wherein the file integration interface enables a user to change the information used to identify the dataset.

15. A non-transitory computer readable medium comprising instructions that, when executed, cause one or more processors to perform:
    determining a file to be integrated into a dataset, the file characterized by a file name and metadata;
    determining that at least one of the file name or the metadata comprises first partial information for identifying the dataset;
    determining that the dataset is not identifiable based solely on the first partial information;
    responsive to the dataset not being identifiable based solely on the first partial information, dynamically determining that second partial information indicative of one or more attributes of the file that are not determinable from the file name or the metadata is needed to identify the dataset;
    responsive to dynamically determining that the second partial information is needed to identify the dataset, requesting the second partial information;
    receiving the second partial information;
    determining that the dataset is identifiable based on the combination of the first partial information and the second partial information; and
    responsive to the dataset being identifiable based on the combination of the first partial information and the second partial information, routing the file for integration into the dataset.

16. The non-transitory computer readable medium of claim 15, wherein at least some of the metadata is identified based on parsing the file name.

17. The non-transitory computer readable medium of claim 15, wherein the file includes binary data, and at least some of the metadata is identified based on decoding a portion of the binary data.

18. The non-transitory computer readable medium of claim 15, wherein requesting the information needed to identify the dataset includes displaying the information needed to identify the dataset within a file integration interface.

19. The non-transitory computer readable medium of claim 18, wherein the file integration interface provides a preview of the file.

20. The non-transitory computer readable medium of claim 18, wherein the file integration interface provides a view of information used to identify the dataset.

* * * * *